Sept. 4, 1962      C. E. BEARD      3,052,246
CONTAINER FOR CONTACT LENSES
Filed April 6, 1961
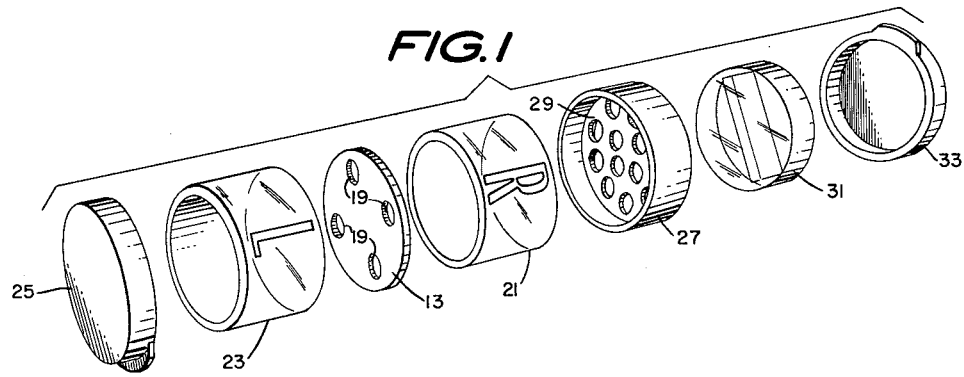
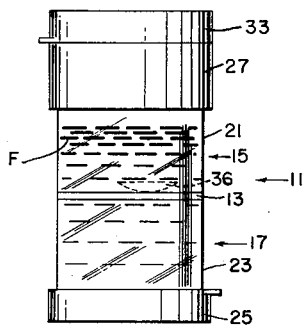
FIG.2
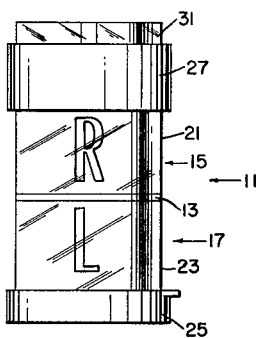
FIG.3
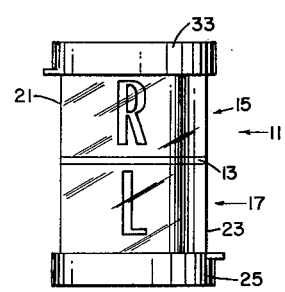
FIG.4
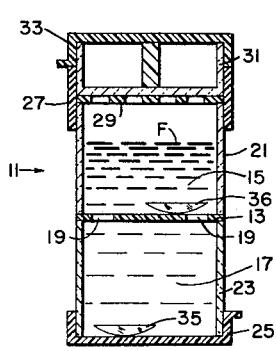
FIG.5
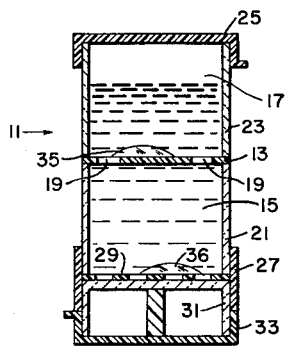
FIG.6
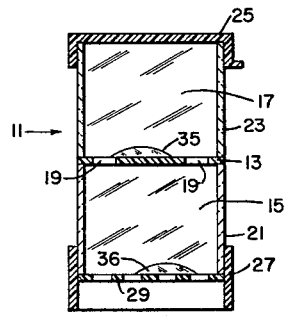
FIG.7
INVENTOR,
Chester E. Beard

United States Patent Office 3,052,246
Patented Sept. 4, 1962

3,052,246
CONTAINER FOR CONTACT LENSES
Chester E. Beard, Hickory Flat, Miss.
Filed Apr. 6, 1961, Ser. No. 101,154
4 Claims. (Cl. 134—155)

This invention relates to certain new and useful improvements in containers particularly adapted for storing and retaining contact lenses when not in use. The increasing popularity of the usage of contact lenses by those of defective vision, in lieu of the customary and conventional eyeglasses heretofore known, has created a problem with respect to the cleaning and proper preservation of the lenses when not in use. With this problem in mind a number of attempts at solutions thereof have heretofore been made, among which may be noted Patent No. 2,944,661. Prior attempts at the solution of this problem have shown that due to various difficulties and defects they are not completely satisfactory for the purposes for which intended, and as a result there is a deficiency in their commercial acceptance for such purpose.

The present device is intended to overcome difficulties which have heretofore arisen. Among the difficulties which have heretofore been presented have been those which include segregation of the appropriate lenses for right eye and left eye from each other. Contact lens containers should provide means for the introduction of a lubricating fluid, which may be plain water, the substitution therein of a cleaning fluid, which may be any suitable detergent type fluid of a recommended nature, such as a contact cleaning solution recommended by an optometrist or medical person specializing in optical problems, but so far as is known prior devices have failed to provide safety factors protecting the lenses from undue conditions under storage and treatment by lubricants and/or cleaning solutions, together with the difficulties of removal of the lenses from a container and the retention of the lenses within the container when it is desired to drain therefrom the lubricant and/or cleaning solution.

The present invention is designed for the purpose of providing a safe and satisfactory means of completely segregating the lenses of each pair from each other; of permitting the introduction freely into the container of suitable lubricant fluid; of the draining from the container of the lubricant fluid while retaining the lenses in their segregated condition; the subsequent introduction of a suitable cleaning or other type of solution; the following draining from the container of such a cleaning solution; all while maintaining the proper positioning of the lenses for complete and accurate access for subsequent replacement upon the pupils of the user's eyes without danger of intermixture and without danger of loss of the lenses from the container during these operations.

The principal object of the present invention is to provide a new and novel container for contact lenses which separates and segregates the lenses from each other in such manner as to eliminate confusion between the appropriate lens to be adopted and/or used after return to the pupils of the user's eyes, and which further contains means by which lubricant solutions may be easily introduced without disturbing the segregation of the elements, which provides means for churning the lubricant solution from end to end of the device in order to more effectively lubricate the specific lenses, and which further includes means for draining of the lubricant solution and substitution of a cleaning solution with the subsequent usage with the churning action for causing more effective cleaning.

A further object of the invention is to provide a container for contact lenses which includes two container chambers separated by a perforated disc, and with removable closure means connected to the ends of each of the individual chambers.

A further object of the invention is to provide at least one of the removable closure means with a perforated disc-like strainer element permitting the discharge from the container of the contents thereof while effectively preventing the accidental discharge from the container of the lenses contained therein.

A further object of the invention is to provide such a device in which the respective lens-containing chambers are separated by a perforated central disc so that upon inversion of the container the fluid contained therein will be bubbled and churned as it passes through the perforations in the central disc, effecting an action upon the respective lenses involved; and A further object of the invention is generally to improve the design, construction and efficiency of containers for contact lenses.

The means by which the foregoing and other objects of the present invention are accomplished and the manner of their accomplishment will be readily understood from the following specification upon reference to the accompanying drawings, in which:

FIG. 1 is an exploded perspective view of an embodiment of the present invention.

FIG. 2 is a vertically disposed elevation of the assembled device of the embodiment of FIG. 1.

FIG. 3 is a view similar to FIG. 2 with certain parts removed for purposes of illustration.

FIG. 4 is a view similar to FIG. 3 with other parts removed and some of the removed parts of FIG. 2 substituted.

FIG. 5 is a vertical sectional view taken as on the line V—V of FIG. 2.

FIG. 6 is a view similar to FIG. 5 in an inverted condition and illustrating the relationship of the parts and of the lenses contained therein in such inverted condition.

FIG. 7 is a view similar to FIG. 6 with the closure parts removed from the inverted form of FIG. 6 and illustrating the effect of the device when the fluid contained therein has been drained therefrom.

Referring now to the drawings in which the various parts are indicated by numerals, the present container comprises a longitudinally elongated hollow body 11, the said container being open at its opposite extremities, and preferably being formed of a suitable transparent and relatively non-abrasive material such as a number of the "plastic" materials now commercially available. Container 11 is divided by a central disc 13 into two substantially equally sized compartments 15, 17. Flow access between the compartments 15, 17 is provided by the perforations 19 formed in central disc 13.

In the embodiment illustrated in FIG. 1 the respective compartments are defined by individual sleeve-like members 21, 23, between the proximate ends of which disc 13 is sandwiched, the disc 13 extending thereby transversely of the body 11, and being disposed substantially perpendicularly to the longitudinal axis of the container 11. In this form of the device the edges of the sleeves 21, 23 are rigidly and permanently fixed to the surfaces of disc 13 adjacent the periphery of the disc and thus together form an integral body. It will be understood that in other usages a single elongated sleeve may be substituted with a disc being press fitted thereinto to proper position and fixed therein position, or in other situations the body device including the compartments and the separating disc may be molded as an integral unit.

Normally closing the open end of one of the compartments, as the compartment 17, is a removable cap 25 which is friction fitted to the open end of the compartment and effects a closure of such end, and may be removed therefrom to provide access to the interior of the compartment. If desired the cap 25 and body 11 may be complementarily threaded and the cap thus detachably connected to the container.

Removably fixed to the open extremity of the other compartments, such as the compartment 15 is a strainer cap 27 which includes a cap-like portion friction fitted onto the extremity of the compartment, with a perforated disc 29 fitted within the cap and spanning across the open end of the compartment. As in the case of cap 25 the detachable connection of cap 27 may be accomplished by threaded engagement.

Strainer cap 27 preferably extends beyond perforated disc 29 to provide a seat for receiving a closure plug 31, the external diameter of closure plug 31 being substantially equal to the diameter of body 11. In a number of instances it is found desirable to provide an additional removable cap 33 detachably mounted upon the extremities of plug 31 and effecting a concealing closure thereover. Cap 33 is substantially similar to cap 25.

It is preferred that each of the compartments be separately identified by a suitable symbol for defining the lens which is contained therein. Thus there has been shown the symbol "L" on compartment 17 indicating that it contains the left eye lens of the contact lens pair, and similarly, the compartment 15 has been provided with a symbol "R" indicating that it contains the right lens of the contact lens pair.

In the use of the device the respective lenses, including the left lens 35 and the right lens 36, are to be introduced into the interior of the respective compartments. Thus it would be suitable for cap 25 to be removed from the extremity of compartment 17, otherwise marked with the symbol "L," and for the left lens 35 to be inserted therein, and the closure cap 25 replaced upon the open end of the compartment. Thereafter the closure means on the terminal end of compartment 15, including the cap 33 if used, the plug 31, and the removable strainer cap 27, are removed therefrom, and the lens 36 is placed within compartment 15, otherwise indicated with the symbol "R."

After the lenses have thus been placed within the respective compartments of body 11, strainer cap 27 may be replaced and the body 11 filled throughout a majority of its volume with a suitable fluid F, which in the primary instance may consist merely of clear water. The fluid thus introduced flows downwardly through the perforations in the strainer cap into compartment 15, and thence through perforations 19 of central disc 13 into the opposite compartment 17 when the device is positioned as shown, for example, in FIG. 2.

After filling the majority of the volume of container body 11, closure plug 31 may then be replaced in strainer cap 27 effecting closure of the device. The container may be subsequently inverted causing a flow of the fluid F from compartment 17 into compartment 15 through perforations 19, it being found that this flow effects a bubbling, churning type of action which is extremely effective in cleaning loose materials and detritus from the surfaces of the respective lenses 35, 36.

In many instances it is desirable in addition to the use of clear water, which is primarily effective as a lubricant and temporary cleaner, that a contact lens cleaning solution of a type recommended by optical personnel such as optometrists and medical doctors specializing in optical matters should from time to time be inserted into such a container in order to effect a satisfactory and thorough cleaning of the respective lenses. It is, therefore, desirable to drain from the container body 11 all of fluid F contained therein.

One of the principal problems heretofore encountered has been in connection with drainage of fluid from a container on account of the ease of loss of the lenses contained in prior containers. It will be seen that the plug 31 may be removed from the strainer cap 27, the device inverted to the position shown in FIG. 7, and the fluid contained therein drained from the container without danger of either of the lenses being displaced or lost from the container, the same being respectively contained by their respective perforated discs against such accidental discharge and loss.

Thereafter the container may be recharged through the perforated disc 29 of strainer cap 27 with such suitable cleaner solution as is desired. The plug 31 may be returned to strainer cap 27 and inversion and churning action of the injected solution be worked upon the respective lenses within the container, it being noted again that inversion of the device from end to end effects a flow of the fluid contained within the container through the perforations of central disc 13, effecting a bubbling and churning action which proves quite effective in the cleaning and washing of the lenses contained within the container.

Thereafter the cleaning solution may be drained from the container by the removal of closure plug 31 and the draining through the perforated disc 29 of strainer cap 27, completely effecting the cleaning desired of the lenses, yet retaining the same within the container against accidental loss therefrom by virtue of the arrangement just descirbed.

Subsequently strainer cap 27 may be removed providing access to the interior of compartment 15 and the lens 36 may be removed therefrom and placed upon the desired pupil of the wearer. Subsequently cap 25 may be removed from the extremity of compartment 17 and lens 35 removed therefrom and also placed upon the other pupil of the wearer.

It thus will be seen that a highly efficient and convenient means for storing and containing contact lenses is hereby provided, safely carrying the lens without danger of damage to the lenses, providing more efficiently for the lubricating and cleansing thereof during storage and non-use.

It will be observed that the perforations 19 of disc 13 are disposed closely adjacent the periphery of the disc and are preferably substantially equally circumferentially spaced apart in order to enhance the bubbling action of the intercompartment flow upon inversion of the device.

I claim:

1. In a container for contact lenses, an elongated, hollow, open ended body, a central disc, said disc being fixed transversely of said body intermediate its length and dividing said body into two substantially equal size compartments, said disc including a plurality of perforations maintaining fluid flow communication between said compartments, end closure means detachably mounted respectively on the open ends of said compartments, at least one of said end closure means including a strainer cap having a perforated disc, removable means blocking flow from said latter disc and strainer cap, the perforations of said strainer cap perforated disc being smaller than a contact lens placed in the compartment closed by said strainer cap, removal of said removable flow blocking means and inversion of said container discharging fluid from said container while retaining a said lens therein, inversion of said container with said closure means positioned causing fluid flow from compartment to compartment through the perforations of said central disc, bubbling said fluid flow to act upon the lenses respectively housed in said compartments.

2. In a container for contact lenses, an elongated, hollow, open ended body, a central disc, said disc being fixed transversely of said body intermediate its length and dividing said body into two substantially equal size compartments, said disc including a plurality of perforations maintaining fluid flow communication between said compartments, end closure means detachably mounted respectively upon the open ends of said compartments, at least one of said end closure means including a strainer cap having a perforated disc, the perforations of said strainer cap perforated disc being smaller than a contact lens placed in the compartment closed by said strainer cap, whereby inversion of said container discharges fluid from said container while retaining a said lens therein.

3. In a container for contact lenses, an elongated, hollow, open ended body, a central disc, said disc being fixed transversely of said body intermediate its length and dividing said body into two substantially equal size compartments, said disc including a plurality of perforations maintaining fluid flow communication between said compartments, end closure means detachably mounted respectively on the open ends of said compartments, at least one of said end closure means including a strainer cap having a perforated disc, removable means blocking flow from said latter disc and strainer cap, the perforations of said strainer cap perforated disc being smaller than a contact lens placed in the compartment closed by said strainer cap, removal of said removable flow blocking means and inversion of said container discharging fluid from said container while retaining a said lens therein.

4. In a container for contact lenses, an elongated, hollow, open ended body, a central disc, said disc being fixed transversely of said body intermediate its length and dividing said body into two substantially equal size compartments, said disc including a plurality of perforations maintaining fluid flow communication between said compartments, an imperforate cap detachably mounted on the open end of one of said compartments, a strainer cap having a perforated disc detachably mounted on the open end of the other said compartment, removable means blocking flow from said latter disc and strainer cap, the perforations of said strainer cap perforated disc being smaller than a contact lens placed in the compartment closed by said strainer cap, removal of said removable flow blocking means and inversion of said container discharging fluid from said container while retaining a said lens therein, inversion of said container with said closure means positioned causing fluid flow from compartment to compartment through the perforations of said central disc, bubbling said fluid flow to act upon the lenses respectively housed in said compartments.

References Cited in the file of this patent

UNITED STATES PATENTS

| 771,372 | Kruse | Oct. 4, 1904 |
| 2,944,661 | Goldstein | July 12, 1960 |